United States Patent
Samain

(10) Patent No.: US 9,815,396 B2
(45) Date of Patent: Nov. 14, 2017

(54) ACTUATOR ARRANGEMENT FOR A SEAT AND ADJUSTING METHOD

(75) Inventor: Maxime Samain, Nürnberg (DE)

(73) Assignee: L&P SWISS HOLDING GMBH, Wittenbach (CH)

( * ) Notice: Subject to any disclaimer, the term of this patent is extended or adjusted under 35 U.S.C. 154(b) by 612 days.

(21) Appl. No.: 14/002,280

(22) PCT Filed: Mar. 28, 2011

(86) PCT No.: PCT/EP2011/001554
§ 371 (c)(1),
(2), (4) Date: Aug. 29, 2013

(87) PCT Pub. No.: WO2012/130256
PCT Pub. Date: Oct. 4, 2012

(65) Prior Publication Data
US 2013/0334853 A1    Dec. 19, 2013

(51) Int. Cl.
*B60N 2/66* (2006.01)
*B60N 2/02* (2006.01)
*B60N 2/44* (2006.01)

(52) U.S. Cl.
CPC ............. *B60N 2/6671* (2015.04); *B60N 2/02* (2013.01); *B60N 2/0232* (2013.01); *B60N 2/448* (2013.01); *B60N 2/66* (2013.01)

(58) Field of Classification Search
CPC ...................................................... B60N 2/66
USPC .......................................... 297/284.4, 284.1
See application file for complete search history.

(56) References Cited

U.S. PATENT DOCUMENTS

| | | | | |
|---|---|---|---|---|
| 4,752,980 | A * | 6/1988 | Nafte | A47D 9/04 5/108 |
| 4,798,414 | A * | 1/1989 | Hughes | A47C 7/462 297/284.4 |
| 4,924,859 | A * | 5/1990 | Pajevic | A61H 11/02 601/101 |
| 6,050,641 | A * | 4/2000 | Benson | B60N 2/0232 297/284.1 |
| 6,676,214 | B2 * | 1/2004 | McMillen et al. | 297/284.1 |
| 7,052,087 | B2 * | 5/2006 | McMillen | 297/284.4 |

(Continued)

FOREIGN PATENT DOCUMENTS

| | | |
|---|---|---|
| CN | 1878488 A | 12/2006 |
| CN | 101137850 A | 3/2008 |

(Continued)

OTHER PUBLICATIONS

International Search Report for International Patent Application No. PCT/EP2011/001554, dated Nov. 25, 2011.

*Primary Examiner* — David E Allred
(74) *Attorney, Agent, or Firm* — Michael Best & Friedrich LLP

(57) ABSTRACT

An actuator arrangement for a seat includes a plurality of traction members and an actuator coupled to the plurality of traction members. The actuator has at least one first drive member which is rotatably supported. The actuator may include a second drive member which is supported moveably relative to the at least one first drive member. The traction members are coupled to the at least one first drive member so that rotation of the at least one first drive member gives rise to a cyclical change in the traction applied by the traction members.

17 Claims, 11 Drawing Sheets

(56) References Cited

U.S. PATENT DOCUMENTS

| | | | | |
|---|---|---|---|---|
| 7,464,620 | B2* | 12/2008 | Li et al. | 74/425 |
| 7,585,027 | B2* | 9/2009 | Blendea | B60N 2/66 |
| | | | | 297/284.1 |
| 7,770,972 | B2* | 8/2010 | Popa | 297/284.4 |
| 7,918,506 | B2* | 4/2011 | Hsiao | A47C 7/462 |
| | | | | 297/284.11 |
| 2003/0227203 | A1* | 12/2003 | Mundell | A47C 7/465 |
| | | | | 297/284.4 |
| 2004/0084942 | A1* | 5/2004 | Frank | 297/284.4 |
| 2005/0168027 | A1* | 8/2005 | McMillen | B60N 2/0232 |
| | | | | 297/284.4 |
| 2006/0178603 | A1* | 8/2006 | Popescu | A47C 7/465 |
| | | | | 601/93 |
| 2006/0273643 | A1* | 12/2006 | McMillen | 297/284.4 |
| 2007/0108816 | A1* | 5/2007 | McQueen et al. | 297/284.4 |
| 2007/0239090 | A1* | 10/2007 | Mitea | A61H 15/0078 |
| | | | | 601/112 |
| 2008/0164738 | A1* | 7/2008 | Colja et al. | 297/284.4 |
| 2008/0203794 | A1* | 8/2008 | Steffen et al. | 297/284.4 |
| 2014/0070583 | A1* | 3/2014 | McMillen et al. | 297/284.4 |
| 2014/0070584 | A1* | 3/2014 | McMillen et al. | 297/284.4 |
| 2017/0000670 | A1* | 1/2017 | Ead | A61G 7/05769 |

FOREIGN PATENT DOCUMENTS

| | | | |
|---|---|---|---|
| EP | 1762155 | A1 | 3/2007 |
| WO | 2004107918 | A1 | 12/2004 |
| WO | 2006105989 | A1 | 10/2006 |

* cited by examiner

ACTUATOR ARRANGEMENT FOR A SEAT AND ADJUSTING METHOD

FIELD OF THE INVENTION

The invention relates to an actuator arrangement for a seat and to a method of adjusting an adjustable component of a seat.

BACKGROUND OF THE INVENTION

Vehicle seats are relatively complex structures including a combination of subsystems that may be used to position the seat, to provide heating and cooling, or to provide an adjustable lumbar support, in addition to providing a comfortable seating area for occupants. Most importantly, vehicle seats must provide a safe and comfortable seating area. Comfortable seating is increasingly important for drivers or passengers who spend extended time periods in a motor vehicle.

Various adjustable seat components are known which add to comfort. For illustration, an adjustable lumbar support structure may be integrated into the backrest of a vehicle seat. The adjustable lumbar support structure may be configured such that an amount of curvature and/or an apical position may be adjusted. In addition, massage functions may be provided in which different zones of the lumbar structure are displaced in a cyclical manner to produce a massage effect. Such lumbar support structures frequently include a flexible member which may be formed of a wire framework and/or a plastic member, suspended on a frame of the backrest.

A change in curvature and/or apex position or a massage function may be implemented in various ways. For illustration, plural traction members may be coupled to different zones of an adjustable component to selectively apply traction thereto. Bowden cables may be used as traction members, with the inner cable of the Bowden cable and the sheath of the Bowden cable being connected to the adjustable component and/or seat frame, such that a portion of the component can be displaced as a function of the free length of the inner cable which extends from the end of the sheath.

Traditionally, a separate actuator is provided for each Bowden cable. An example for such a configuration is described for example in WO 2006/105989 A1. While such a configuration provides a high degree of control over the traction applied to the different zones of the adjustable component, it may also require a significant amount of installation space in the backrest. Further, logic circuitry must be provided for controlling the different actuators in a coordinated manner, for example in order to implement a massage function. This adds to costs.

EP 1 762 155 A1 describes a support assembly in which the inner cables of two Bowden cables are connected to one actuator. Rotation of the actuator may cause one of the wires to be wound up and the other one to be unwound at the same time. A massage function can be realized by controlling the actuator so as to cyclically reverse its direction of rotation. For enhanced comfort, it may be desirable to provide an arrangement in which the number of zones that can be actuated can be easily increased.

BRIEF SUMMARY OF THE INVENTION

There is a continued need in the art for an actuator arrangement for a seat and for a method of adjusting an adjustable component of a seat which provides good comfort at moderate costs. There is also a continued need in the art for an actuator arrangement and a method which does not require a dedicated actuator to be installed in the seat for each one of a plurality of traction members.

According to an embodiment, an actuator arrangement for an adjustable component of seat is provided. The actuator arrangement comprises a plurality of traction members and an actuator. The plurality of traction members is respectively configured to apply traction onto an associated portion of the adjustable component. The actuator has at least one first drive member which is rotatably supported. The plurality of traction members is coupled to the at least one first drive member such that a rotation of the at least one first drive member in a direction of rotation changes the traction applied by each one of the plurality of traction members onto the associated portion of the adjustable component respectively in a cyclical manner.

In the actuator arrangement having this configuration, a cyclical change in the traction applied by the traction members is attained by rotating the at least one first drive member in the direction of rotation. It is not required to reverse the direction of rotation to effect an increase and subsequent decrease in the traction applied.

The actuator arrangement may be configured such that, for any one of the two directions of rotation of the at least one first drive member, the traction applied by the traction members changes cyclically when the at least one first drive member continues to rotate in the direction of rotation, without requiring the direction of rotation to be reversed.

The actuator arrangement may be configured such that, when the at least one first drive has completed a rotation by 360 degree, the traction applied by each one of the traction members coupled to the at least one first drive member is identical to the traction applied at the beginning of the respective 360 degree rotation of the at least one first drive member, According to another embodiment, an actuator arrangement for an adjustable component of a seat is provided. The actuator arrangement comprises a plurality of traction members and an actuator. The plurality of traction members is respectively configured to apply traction onto an associated portion of the adjustable component. Each one of the traction members comprises a first element and a second element which are displaceable relative to each other. For each traction member, one of the first element and the second element forms a conduit for the other one of the first element and the second element. The actuator is coupled to the plurality of traction members. The actuator comprises at least one first drive member which is rotatably supported and a second drive member which is moveably supported. The first elements of the plurality of traction members are coupled to the at least one first drive member. The second elements of the plurality of traction members are coupled to the second drive member.

In this actuator arrangement, the at least one first drive member can be rotated to cause the traction applied by the various traction members to be respectively altered in a cyclical manner. Thereby, a cyclical change in tension can be effected by rotating the at least one first drive member. It is not required to reverse the rotation direction of the at least one first drive member to attain the cyclical chance in tension. By stopping rotation of the first drive member at a desired location, a given configuration of the adjustable component may be set. For illustration, a given apex position of a lumbar support may be set by stopping rotation of the at least one first drive member.

With the second drive member being coupled to the second elements of the traction members, all second elements can be moved by displacing the second drive member. This allows an amplitude of the traction applied by the traction members to be adjusted. For illustration, the strength of a massage movement may be adjusted by displacing the second drive member, or a curvature of the adjustable component may be adjusted by displacing the second drive member.

In an implementation, the traction members may respectively be configured as Bowden cables. Each Bowden cable has a sheath which forms a conduit for an inner cable. The inner cable may be configured as a wire or may include plural wires. The sheath and the inner cable respectively have a first end and a second end. The first end of the sheath and the first end of the inner cable may be coupled to the actuator. By rotation of the at least one first drive member, the length by which the inner cables respectively project from the sheath may be cyclically adjusted. The adjustment is alternating for different Bowden cables. For illustration, rotation of the at least one first drive member will affect the length by which the inner cables of different Bowden cable project from the associated sheaths such that, at a given time, the length is decreased for one inner cable and simultaneously increased for another inner cable, while at another time the length is increased for the one inner cable and simultaneously decreased for the other inner cable, without having to reverse the direction of rotation of the first drive member therebetween. By displacing the second member, an offset length by which the inner cables project from the associated sheaths may be simultaneously adjusted for all Bowden cables.

The first elements of the plurality of traction members may be coupled to the at least one first drive member such that a 360° rotation of the at least one first drive member in one direction of rotation effects a reciprocating movement of the first elements coupled thereto relative to the associated second element. This allows the traction applied by a traction member to be altered cyclically when the at least one first drive member continues to rotate in one direction. The control logic required to implement a massage function can be simplified. The reciprocating movement of the first elements relative to the second elements may be such that, when the at least one first drive member has completed a 360° rotation, the position of each one of the first elements relative to the associated second element is identical to that at the beginning of the 360° rotation.

The actuator may be configured such that an amplitude of the reciprocating movement is adjustable by repositioning the second drive member. Thereby, the amplitude of the traction exerted by the traction members can be easily adjusted by displacing the second drive member to a new position, such as by linear displacement or rotation.

The first elements of the plurality of traction members may respectively be coupled to the at least one first drive member by mounts. The mounts may be attached to the at least one first drive member at a position which is offset from the rotation axis.

The mounts may respectively be rotatable relative to the at least one first drive member about a rotation axis which extends parallel to a rotation axis of the of the at least one first drive member. Thereby, a cyclical displacement of the first elements upon rotation of the at least one first drive member can be implemented.

The at least one first drive member may include one rotatable cam or plural rotatable cams mounted on a cam shaft. Using rotatable cam(s), ends of inner cables of Bowden cable or of Bowden cable sheaths attached to the actuator can be displaced.

In an exemplary implementation, only one first drive member may be provided to which the first elements of all traction members are coupled. In another implementation, several first drive members are provided, a number of the first drive members being less than a number of traction members. Plural first elements may be coupled to each one of the first drive members. For illustration, in an exemplary implementation, two disc-shaped first drive members may be provided, and respectively two first elements may be coupled to each one of the first drive members.

A traction member of the plurality of traction members may be configured to apply traction onto the adjustable component when the at least one first drive member is in a given range of angular positions. The actuator may be configured such that the range can be adjusted by displacing the second drive member.

The second drive member may be rotatably supported. A rotation axis of the second drive member may be aligned with or parallel to a rotation axis of the at least one first drive member. This allows the actuator to be provided with a particularly compact design.

The second drive member may alternatively also be supported so as to be linearly displaceable. Thereby, the actuator may be provided with a simple configuration.

Portions of the first elements may be secured on the second drive member so as to be displaced therewith. For illustration, ends of the first elements may be secured on the second drive member, while intermediate portions of the first elements are coupled to the at least one first drive member. Thereby, a more compact design of the actuator can be attained.

The actuator may comprise a housing in which the at least one first drive member is housed. The second drive member may be moveably supported in or on the housing. By virtue of such a configuration, the number of components to be mounted in the seat may be decreased, thereby reducing installation time, space and cost.

In an implementation, the second drive member may be omitted. The actuator may comprise a housing in which the at least one first drive member is housed. The actuator may comprise a power drive for displacing the housing relative to the adjustable component. Thereby, an amplitude adjustment may be realized.

The actuator may include a power drive operatively coupled to the at least one first drive member to rotationally drive the at least one first drive member. The actuator may include a further power drive operatively coupled to the second drive member to drive the second drive member.

The actuator arrangement may include more than two, in particular at least four, traction members. Thereby, more than two regions of the adjustable seat component may be actuated under the action of the actuator arrangement. For example, the adjustable component of the seat may have four, five, six or more than six zones, and a traction member may be coupled to each one of the zones. Nevertheless, an adjustment of the adjustable component may be controlled using the at least one first drive member and the second drive member.

According to another embodiment, a seat structure is provided. The seat structure includes the actuator arrangement of any one aspect or embodiment and an adjustable component. The adjustable component has a plurality of zones offset along a direction. Each one of the plurality of traction members may be coupled to respectively one of the plurality of zones.

The adjustable component may be a lumbar support. The adjustable component may include a wire framework and/or a plastic member. The adjustable component may be mounted in a back of a seat. The different zones may be offset along the longitudinal axis of the back. By virtue of the actuator arrangement, a massage function may be implemented in the lumbar region using the actuator. Alternatively or additionally, an apical position of the lumbar support may be adjusted along the longitudinal direction by rotating the at least one first drive member until the apical position is at a desired location and then discontinuing rotation. An amount of curvature of the lumbar support may be set by displacing the second drive member.

The seat structure may further include a frame. Transverse wires may extend between sides of the frame and may be identical to, or coupled to, the first elements or second elements of the traction members. The transverse wires may be spaced along the longitudinal axis of the frame.

According to another embodiment, a method of adjusting an adjustable component of a seat is provided. The adjustable component has a plurality of zones respectively coupled to a traction member for selectively applying traction thereto. The traction members are coupled to at least one first drive member. In response to a control signal, the first drive member is rotated such that each one of the plurality of traction members cyclically applies traction onto the associated zone while the first drive member rotates in a direction of rotation so as to perform plural full rotations.

Using this method, a cyclical change in traction may be applied onto plural zones of an adjustable component without requiring the direction of rotation of the at least one first drive member to be reversed.

According to another embodiment, a method of adjusting an adjustable component of a seat is provided. The adjustable component has a plurality of zones respectively coupled to a traction member for selectively applying traction thereto. Each one of the traction members comprises a first element and a second element, the first elements of the plurality of traction members being coupled to at least one first drive member, and the second elements of the plurality of traction members being coupled to a second drive member. In response to a control signal, the first drive member is rotated such that each one of the plurality of traction members applies traction onto the associated zone in a cyclical fashion while the first drive member continues to rotate in a direction of rotation. In response to another control signal, the second drive member is displaced to adjust an amplitude of the traction respectively applied by the plurality of traction members to the plurality of zones.

In this method, a massage effect may be implemented by rotation of the at least one first drive member. Rotation of the at least one first drive member gives rise to a cyclical variation in traction. By displacing the second drive member, an amplitude of the massage effect may be adjusted. More than two zones, in particular, four, five, six or more than six zones of the adjustable component may be adjusted using the at least one first drive member and the second drive member of the actuator. It is not required to provide a dedicated actuator for each zone.

The rotation of the first drive member may be cyclically continued to effect a massage movement. This may be done in response to the control signal indicating that a massage function is to be activated.

The rotation of the first drive member may be stopped in response to yet a further control signal to set a position of an apex of said adjustable component. The further control signal may be generated based on a user action to set the position of the apex.

The method may be performed using an actuator arrangement of any one aspect or embodiment.

The actuator arrangement and method according to embodiments may be utilized for various seats having an adjustable component. For illustration, the actuator arrangement and the method may be utilized to adjust a lumbar support in a motor vehicle seat.

Embodiments of the invention will be described with reference to the accompanying drawings.

DETAILED DESCRIPTION OF EMBODIMENTS

Figure 1:
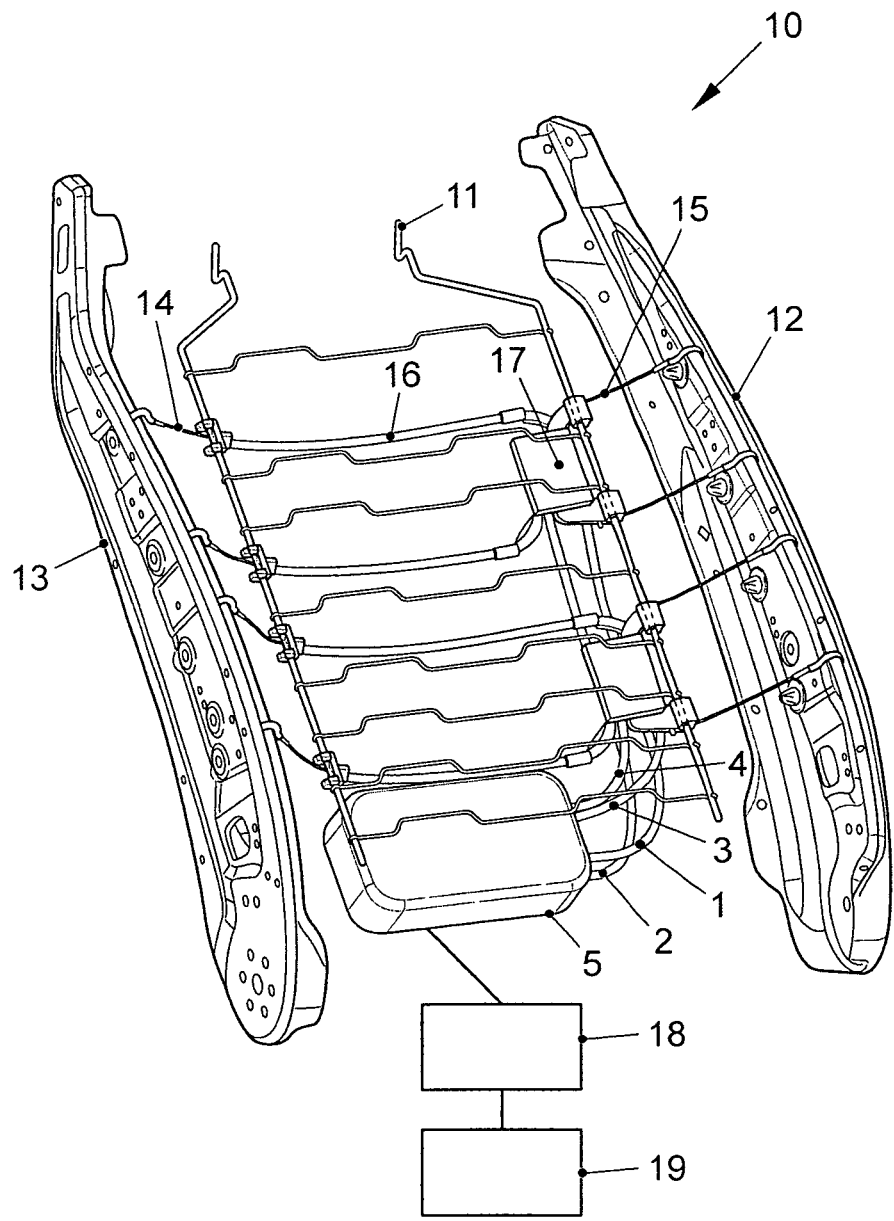
FIG. 1 is a perspective view of a seat structure having an actuator arrangement according to an embodiment.

Exemplary embodiments of the invention will be described with reference to the drawings. While some embodiments will be described in the context of specific structural features, such as support members formed as wire pads, the embodiments are not limited to these specific structural features. The features of the various embodiments may be combined with each other unless specifically stated otherwise. Elements or features which correspond to each other with regard to their construction and/or function are designated with the same reference numerals.

Several embodiments will be described with reference to a lumbar support structure for a seat, in particular for a motor vehicle seat. In this context, terms such as "side", "upper", "lower", "forward", "rearward" or similar refer to positions or directions given in a vehicle frame of reference. I.e., a "lower" side or end is a side or end facing towards the vehicle base, an "upper" side or end is a side or end facing towards the vehicle roof, and the "lateral" direction is a direction parallel to the vehicle base and orthogonal to the vehicle longitudinal axis. A "forward" direction corresponds to an occupant's viewing direction parallel to center axis of the vehicle seat, and the "rearward" direction is opposite to the "forward" direction.

FIG. 1 shows a seat structure 10 for a vehicle seat. The seat structure 10 includes an adjustable component 11. The adjustable component 11 may be configured as a wire framework, as shown in FIG. 1, but may also have another configuration. For illustration, the adjustable component 11 may comprise one or several plastic belts and/or wires forming a wire framework. The adjustable component 11 generally extends between side members 12, 13 of the seat back frame.

A plurality of wires are attached to the sides of the adjustable component 11 at plural positions offset along the sides of the adjustable components. For illustration, wires 14 and 15 are connected to the adjustable component 11 in an upper portion thereof. A part of the wire 14 is guided along the rear side of the adjustable component 11 in a sheath 16. The sheath 16 is attached to the two sides of the adjustable component 11, for example using clips. The wires 14, 15 are secured on the sides 12, 13 of the frame. When traction is applied to the wires 14, 15, a force is exerted onto the portion of the adjustable component 11 to which the wires 14, 15 are attached. The force causes the portion to move forward, thereby deforming the adjustable component 11. Similarly, wires are coupled to the adjustable component 11 at a plurality of positions for adjustment of various portions or zones of the adjustable component 11. In FIG. 1, the adjustable component 11 has four zones which are offset along the longitudinal direction of the adjustable component 11 and which are respectively coupled with wires or other elements which can exert a force onto the respective zone.

In order apply traction onto the wires, an actuator arrangement is provided. The actuator arrangement includes a plurality of traction members 1-4 and an actuator 5. Each one of the plurality of traction members 1-4 is associated with one of the zones of the adjustable component 11. For illustration, the traction member 1 is coupled to the wires 14, 15 associated with the topmost zone of the adjustable component 11 via a connecting member 17. The connecting member 17 may be operative to convert traction applied by the traction member 1 into a traction or tension of the wires 14, 15.

The traction members 1-4 respectively include a first element and a second element. For each one of the traction members, one of the first element and the second element serves as a conduit for the other one. For illustration, each one of the traction members 1-4 may be a Bowden cable which has a sheath and an inner cable arranged therein. Both the sheaths and the inner cables of the plural Bowden cables are attached to the actuator 5.

Construction and operation of the actuator will be explained in more detail with reference to FIGS. 2-13. Generally, the actuator 5 includes one first drive member or plural first drive members and a second drive member. The first drive member(s) and the second drive member may all be integrated in one housing. The first drive member(s) are supported so as to be rotatable. The second drive member is supported so as to be moveable relative to the at least one first drive member. The second drive member may, for example, be supported so as to be linearly displaceable or so as to be rotatable.

The first elements of the traction members 1-4 are coupled to the at least one first drive member. There is at least one first drive member to which plural first element of the traction members 1-4 are attached. The second elements of the traction members 1-4 are coupled to the second drive member. In some embodiments, the first elements coupled to the at least one first drive member may be inner cables of Bowden cables, and the second elements coupled to the second drive member may be sheaths of the Bowden cables. In other embodiments, the first elements coupled to the at least one first drive member may be sheaths of Bowden cables, and the second elements coupled to the second drive member may be inner cables of the Bowden cables.

Generally, the function of the at least one first drive member is to displace the first elements coupled thereto relative to the associated second elements of the traction members 1-4 in a cyclical manner. Rotation of the at least one first drive member in a direction of rotation may give rise to a reciprocating movement of the first elements relative to the associated second elements of the traction members, without requiring the rotation direction of the at least one first drive member to be reversed to this end. The position of the first elements relative to the associated second elements may be changed in an alternating manner such that, when an end of the first element of a first traction member 1 is pushed outward relative to an end of the associated second element of the first traction member 2, the end of the first element of another traction member 2-4 may be drawn inward relative to the end of the associated second element of the other traction member 2-4, at least for a fraction of a periodic cycle.

The function of the second drive member is to adjust an offset in the relative position between the positions of the end of the first elements relative to the end of the associated second elements of the traction members 1-4.

For illustration, if the first elements are inner cables of Bowden cables and the second elements are sheaths of the Bowden cables, the inner cables are coupled to the at least one first drive member and the sheaths are coupled to the second drive member. When the at least one first drive member is not rotationally driven, moving the second drive member allows the inner cables of all traction members to be played out of the associated sheaths or to be drawn into the associated sheaths, depending on the direction in which the second drive member is moved relative to the at least one first drive member. When the at least one first drive member rotates, the inner cable of each Bowden cable will be cyclically played out from the associated sheath and drawn into the associated sheath. If the second drive member remains stationary in this process, the relative positions of inner cable and sheath after the at least one first drive member has completed a 360° rotation will be identical to the relative positions at the beginning of the 360° rotation. By rotating the at least one first drive member, the traction applied by the Bowden cables may thus be altered cyclically.

The actuator 5 allows a massage function to be implemented by rotating the at least one first drive member in a direction of direction, without requiring this direction to be reversed or without requiring coordination between different actuators. Re-setting the position of the second drive member relative to the at least one first drive member adjusts the amplitude of the massage movement. This may be attained without requiring a dedicated actuator for each one of the Bowden cables, and/or logic circuitry for coordinating such dedicated actuators.

Further, by rotating the at least one first drive member until an apical position of the adjustable component 11 is at a desired location and then discontinuing rotation of the at least one first drive member, an apical position of the adjustable component 11 may be set. A curvature may be adjusted by moving the second drive member to another position relative to the at least one first drive member.

The actuator arrangement may further include an interface 19 to receive control signals. The control signals may indicate a user action to start and stop a massage function or to adjust an amplitude of a massage effect. A control circuit 18 may be provided. As the actuator 5 does not require coordinated actuation of separate actuators for implementing a massage function, the control circuit 18 may have a very simple configuration or may be omitted altogether. For illustration, one switch coupled to a power drive for the at least one first drive member would allow a user to start and stop rotation of the at least one first drive member by establishing or blocking power supply for driving the at least one first drive member.

With reference to FIGS. 2-13, implementations of actuators according to embodiments will be described in more detail. The actuators may respectively be used as actuator 5 in the seat structure 10 of FIG. 1.

Figure 2:
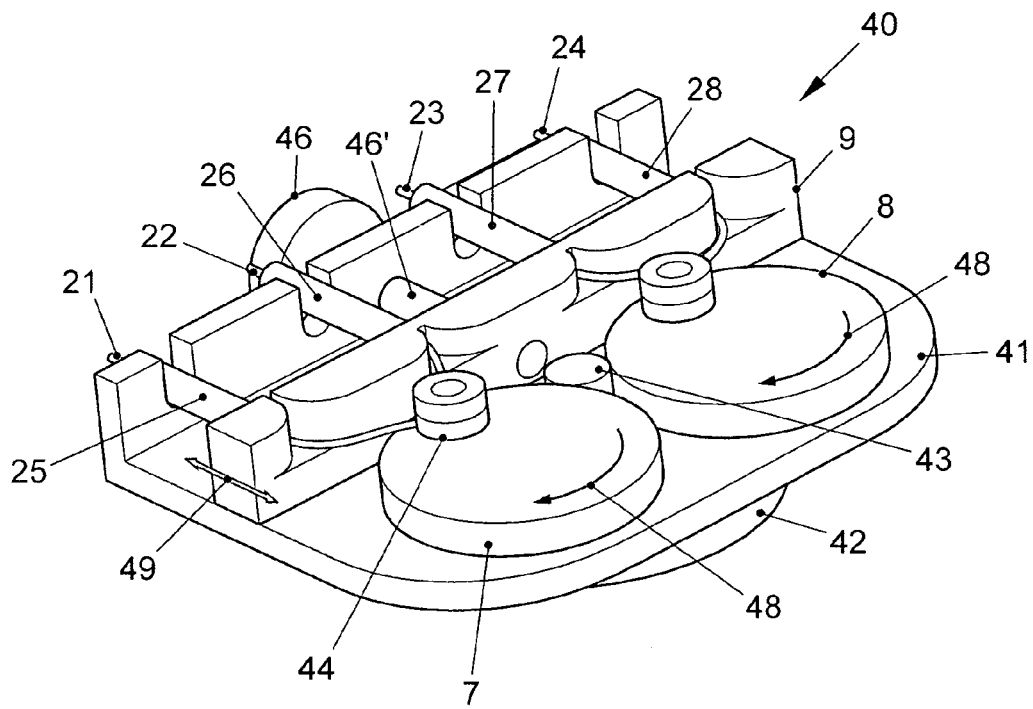
FIG. 2 is a schematic perspective view showing an actuator of an actuator arrangement according to an embodiment.
Figure 3:
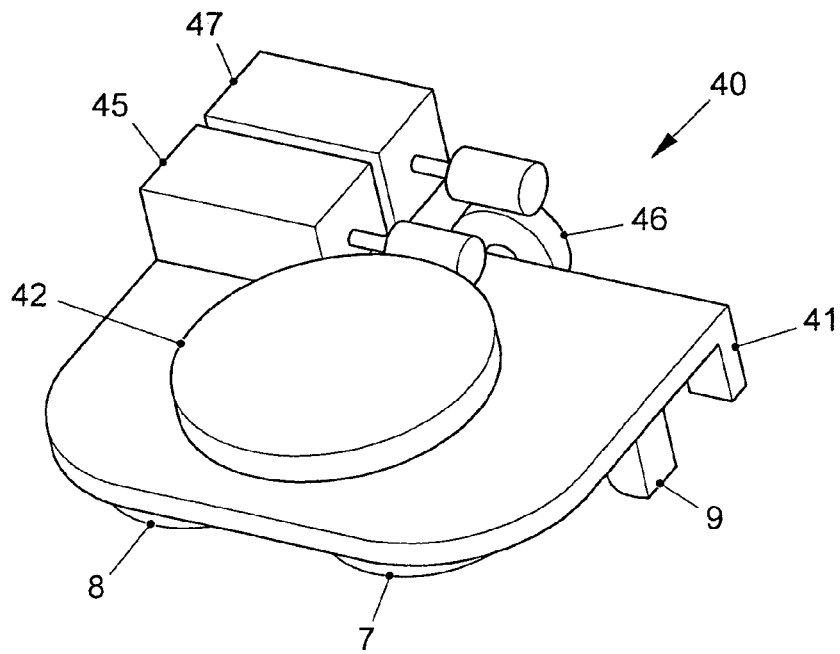
FIG. 3 is a schematic perspective view showing the actuator of FIG. 2 from a different perspective.

FIGS. 2 and 3 show an actuator arrangement 40 according to an embodiment. The actuator arrangement includes traction members respectively configured as Bowden cables and an actuator. The traction members respectively have an inner cable 21-24 and a sheath 25-28 in which the associated inner cable 21-24 is guided. In the actuator arrangement 40, the inner cables 21-24 serve as first elements coupled to rotatable first drive members and the sheaths 25-28 serve as second elements coupled to a linearly displaceable second drive member.

The actuator includes a housing which may have a wall 41, which may be an inner wall of the housing. Two first drive member 7 and 8 are respectively rotatably supported on the inner wall 41. The first drive members 7 and 8 are respectively configured as toothed wheels. The inner cables 21, 22 of two traction members are coupled to the first drive member 7 via a mount 44. The inner cables 23, 24 of two other traction members are coupled to the first drive member 8 via a mount. The mounts 44, and thus the location at which the inner cables 21-24 are attached to the associated first drive member 7 and 8, respectively, are offset from the rotation axis of the respective first drive member. The mounts 44 are configured such that the inner cables 21-24 are not wound up around the mounts 44 or any other element when the first drive member rotates. For illustration, the mount 44 may include an annular member to which an end of an inner cable 21-24 is fixedly secured and which is freely rotatable about a pin projecting from the first drive member 7 or 8, respectively.

A second drive member 9 is supported so as to be linearly displaceable along the inner wall 41 of the housing. Ends of the sheaths 25-28 of the Bowden cable are secured on the second drive member 9. For illustration, the second drive member 9 may define a cavity for each one of the sheaths 25-28 in which an end of the sheath is received and retained.

The actuator also includes a first power drive 45 and a first transmission to rotationally drive the first drive members 7, 8. The first power drive 45 may be an electric motor. The first power drive and first transmission may also be integrated into the actuator housing. The first transmission, which is schematically indicated at 42, 43 may be a speed reduction transmission. The first transmission may include a worm drive having a worm on the output shaft of the first power drive 45 and a worm gear 42. A toothed wheel 43 which is rigidly formed on the worm gear 42 is in toothed engagement with a toothing on the first drive members 7 and 8. The toothed wheel 43 may have a diameter which is small compared to a diameter of the first drive member 7 and 8, respectively. A two-stage speed reduction is thereby attained. This reduces the requirements imposed on the output torque of the first power drive 45.

The actuator also includes a second power drive 47 and a second transmission to displace the second drive member 9 along a linear path in a translatory manner. The second power drive 47 may be an electric motor. The second power drive and second transmission may also be integrated into the actuator housing. The second transmission, which is schematically indicated at 46, 46' may include a spindle drive or another drive which is capable of converting a rotational movement of the output shaft of the second power drive 47 into a linear displacement of the second drive member 9. The second transmission may include a worm drive having a worm on the output shaft of the second power drive 47 and a worm gear 46. The worm gear may be coupled or rigidly attached to a spindle 46'. The spindle 46' may be engaged with a mating thread on the second drive member 9.

The inner cables 21-24 respectively have second ends opposite to the ones attached to the first drive members 7 and 8, respectively. The sheaths 25-28 have second ends opposite to the ones attached to the second drive member 9. When power is supplied to the first power drive 45, the first drive member 7 and 8 perform a rotational movement 48. Rotation of the first drive member 7 has the effect that the second ends of the inner cables 21 and 22 are cyclically displaced towards or away from the second ends of the sheaths 25 and 26. I.e., the second ends of the inner cables 21 and 22 are cyclically drawn into and played out of the associated sheaths 25 and 26 as the first drive member 7 continues to rotate. This reciprocating movement is attained without requiring the direction of rotation of the first drive member 7 to be reversed. Similarly, rotation of the first drive member 8 has the effect that the second ends of the inner cables 23 and 24 are cyclically displaced towards or away from the second ends of the sheaths 27 and 28. I.e., the second ends of the inner cables 23 and 24 are cyclically drawn into and played out of the associated sheaths 27 and 28 as the first drive member 7 continues to rotate. Thereby, the traction applied by the different Bowden cables is altered cyclically. If the second drive member 9 is kept stationary, the traction applied by each one of the Bowden cables when the first drive members 7 and 8 have completed a 360° rotation is identical to the traction applied at the beginning of the 360° rotation. The movement between inner cable and sheath may be alternating for different Bowden cables. For example, in a fraction of the periodic cycle, the second end of the inner cable 21 may be played out of the second send of the sheath 25 while the second end of the inner cable 22 may at the same time be drawn into the second end of the sheath 26. In another fraction of the periodic cycle, the second end of the inner cable 21 may be drawn into the second end of the sheath 25 while the second end of the inner cable 22 may at the same time be played out of the second end of the sheath 26.

When the second power drive 47 is actuated, the second drive member 9 is displaced as indicated by movement arrow 49. Displacement of the second drive member 9 effects displacement of the sheaths 25-28 attached to the second drive member 9. Thereby, an offset length by which the inner cables 21-24 protrude, with their second ends, from the second ends of the sheaths 25-28 may be adjusted. In terms of traction, this gives rise to a change in the amplitude of the traction applied by the respective Bowden cables.

Further, for a massage mode, the time period over which traction is applied by a Bowden cable can be adjusted by displacing the second drive member 9. If the second drive member 9 is set to a position in which the length of the sheaths 25-28 which extend externally of the actuator housing is decreased (i.e., if the second drive member 9 is displaced towards the first drive members 7 and 8 in the actuator arrangement 40), the time period in which the Bowden cables can exert traction at their second ends is increased. Vice versa, if the second drive member 9 is set to a position in which the length of the sheaths 25-28 which extend externally of the actuator housing is increased (i.e., if the second drive member 9 is displaced away from the first drive members 7 and 8 in the actuator arrangement 40), the time period in which the Bowden cables can exert traction at their second ends is decreased.

Figure 4:
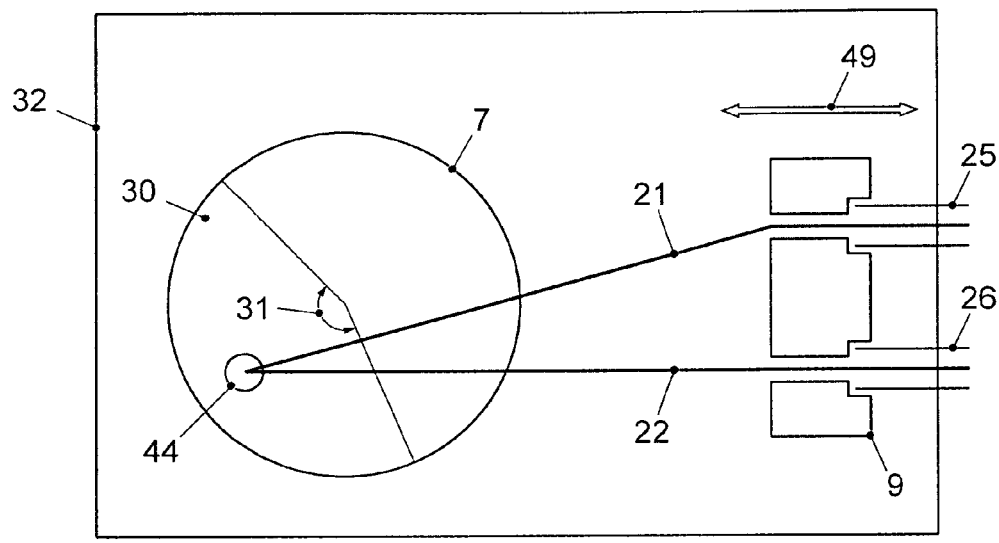
FIG. 4 is a schematic view for illustrating operation of the actuator arrangements according to embodiments.

FIG. 4 is a schematic representation for explaining the operation of the actuator arrangement. For illustration, components of the actuator arrangement 40 are shown. The components, such as the first drive member 7 and the second drive member 9, are arranged within an actuator housing 32. A first end of inner cables 21, 22 of Bowden cables is attached to the first drive member via a mount 44. A first end of sheaths 25, 26 of the Bowden cables is attached to the second drive member 9.

For a given position of the second drive member 9, the Bowden cable having the inner cable 21 and sheath 25 will apply traction at the second end thereof when the mount 44 is positioned within a range 30 of angular positions. The angular range 30 is defined relative to the housing 32 of the actuator and does not change position when the first drive member 7 rotates. The time interval in which the mount 44 is located within the angular range 30 represents the fraction of a periodic cycle in which traction is applied by the Bowden cable constituted by the inner cable 21 and the sheath 25. If the mount 44 is located outside of the range 30, no traction will be applied by the Bowden cable having the inner cable 21 and sheath 25. The actuator may be configured such that, for any one of the Bowden cables, the respective Bowden cable does not apply traction for at least a range of angular positions of the first drive member 7.

When the second drive member 9 is set to another position, as indicated at 49, the angular range 30 will be altered. In particular, an opening angle 31 of the angular range 30 can be adjusted by re-setting the second drive member 9 to a new position. Thereby, the fraction of a periodic cycle in which the Bowden cable constituted by the inner cable 21 and the sheath 25 applies traction can be adjusted. Simultaneously, the amplitude of the applied traction, i.e., the maximum traction applied by the Bowden cable throughout a periodic cycle, can be adjusted.

When the actuator arrangement is used with a lumbar support structure, continued rotation of the first drive member 7 gives rise to a cyclical and alternating actuation of the different zones of the lumbar support structure. An apical position of the lumbar support structure is shifted as the first drive member 7 rotates. In use, a seat occupant can start rotation of the first drive member 7 in order to shift the apical position of the lumbar support structure and may stop the first drive member 7, for example by switching off the first power drive 45, when the apical position is at a desired location. A curvature of the lumbar support structure may then be adjusted by resetting the second drive member 9 to another position relative to the first drive member 7, 8.

Figure 5:
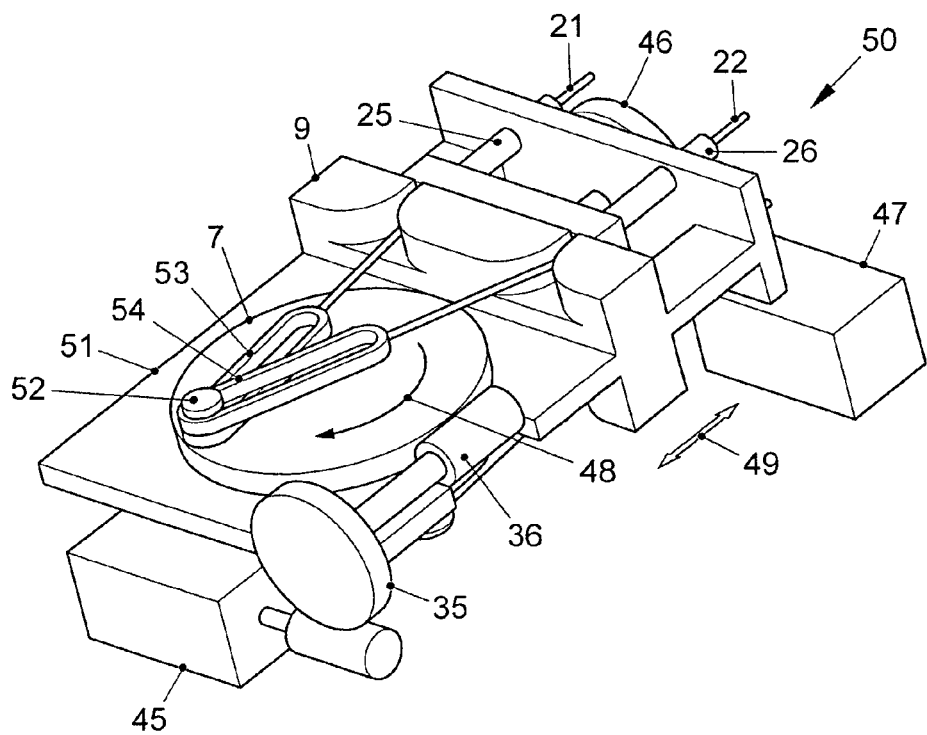
FIG. 5 is a schematic perspective view showing an actuator of an actuator arrangement according to an embodiment.
Figure 6:
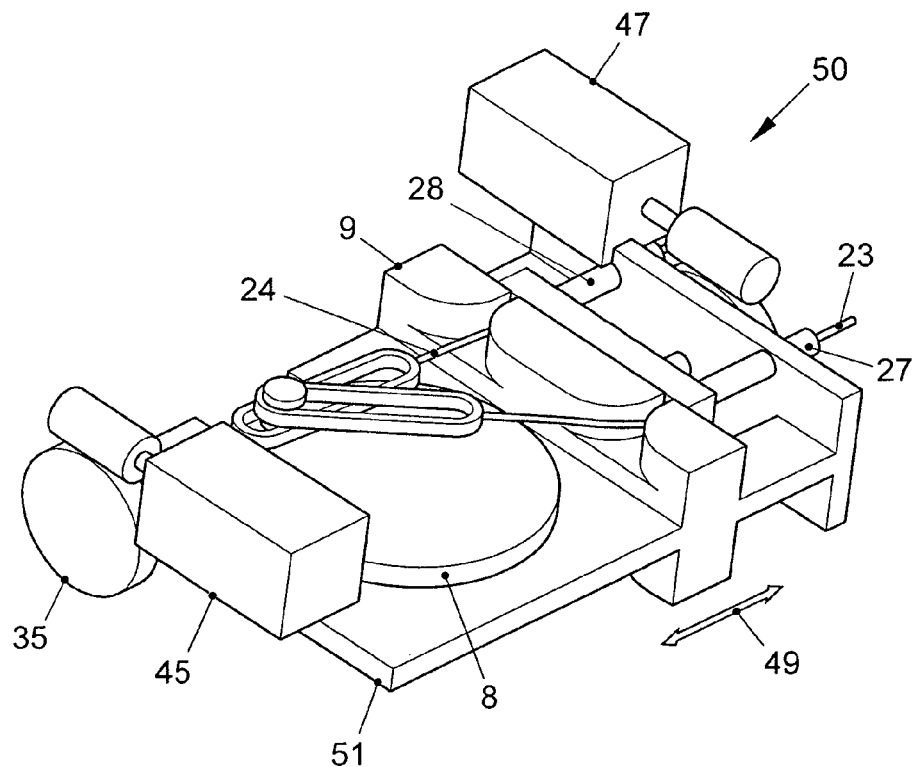
FIG. 6 is a schematic perspective view showing the actuator of FIG. 5 from a different perspective.
Figure 7:
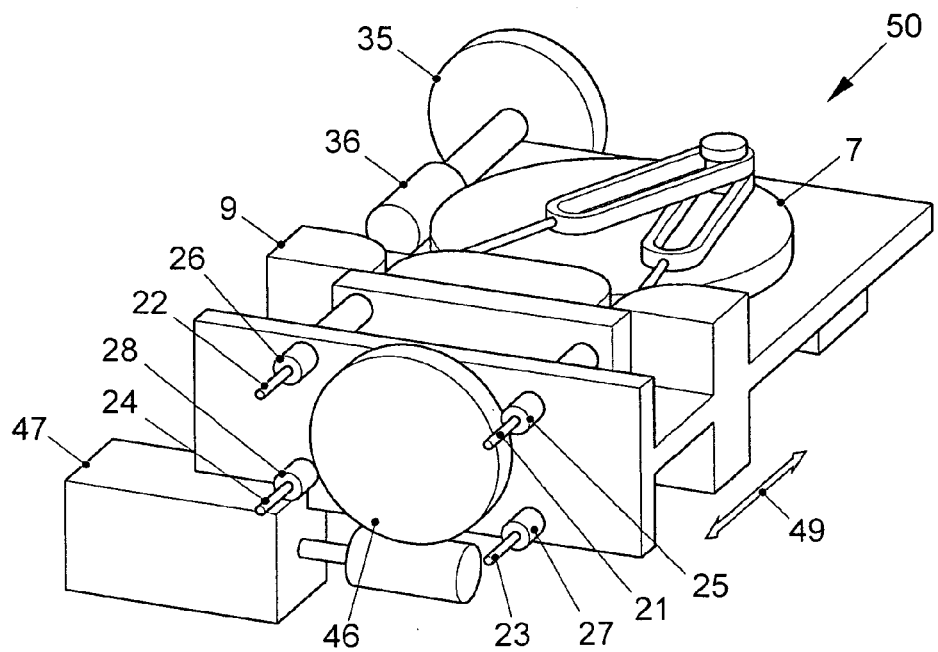
FIG. 7 is a schematic perspective view showing the actuator of FIG. 5 from yet another different perspective.

FIGS. 5-7 show an actuator arrangement 50 according to another embodiment. FIG. 5 shows the actuator from a first point of view disposed on a first side relative to a housing wall 51, and FIG. 6 shows the actuator from a second point of view disposed on a first side relative to the housing wall 51. The actuator arrangement includes traction members respectively configured as Bowden cables and an actuator. The traction members respectively have an inner cable 21-24 and a sheath 25-28 in which the associated inner cable 21-24 is guided. In the actuator arrangement 50, the inner cables 21-24 serve as first elements coupled to rotatable first drive members and the sheaths 25-28 serve as second elements coupled to a linearly displaceable second drive member.

The actuator includes a housing which may have the inner wall 51. Two first drive members 7 and 8 are respectively rotatably supported on the inner wall 51 on opposite sides thereof. The first drive members 7 and 8 are respectively configured as toothed wheels. The inner cable 21 of a traction members may be coupled to the first drive member 7 via a mount 53 which is rotatable about a pin 52. The pin 52 protrudes from the first drive member 7 at a position offset from its rotation axis. The inner cable 22 of another traction members may be coupled to the first drive member 7 via a mount 54 which is also rotatable about the pin 52. The first mount 53 and the second mount 54 may be offset from each other, for example along the axial direction of the pin 52, in order to prevent that the different inner cables 21, 22 interfere with each other.

The inner cables 23, 24 of two other traction members are coupled to the first drive member 8 via a mount which may be configured in the same way as the mounts for inner cables 21, 22. The mounts 53, 54 are configured such that the inner cables 21-24 are not wound up when the first drive member 7 or 8 rotates.

A second drive member 9 is supported on the inner wall 51 so as to be linearly displaceable along the inner wall 51 of the housing. Ends of the sheaths 25-28 of the Bowden cable are secured on the second drive member 9.

A first transmission coupled between a first power drive 45 and the first drive member 7 and 8 includes a two-stage worm drive. A first worm gear 35 is engaged with a worm coupled to the output shaft of the first power drive 45. A second worm 36 is rigidly attached to the first worm gear 35. The second worm 36 is in toothed engagement with an external toothing of the first drive member 7. The first drive member 7 is rigidly coupled, through a passage in the interior wall 51, with the first drive member 8 to ensure joint rotational rotational movement of the two first drive members 7 and 8.

The second transmission between a second power drive 47 and the second drive member 9 is configured as described for the actuator arrangement 40 of FIGS. 2 and 3.

Operation of the actuator arrangement 50 is as described for the actuator arrangement 40. When the first power drive 45 is powered, rotation of the first drive members causes the inner cables 21-24 to be played out of and drawn into the associated sheath 25-28 in a cyclical manner at the second end thereof, which is not attached to the actuator. A cyclical variation in traction applied by the Bowden cables can thereby be attained. When the second power drive 47 is powered, an offset in the length by which the inner cables 21-24 protrude, at the second ends thereof, from second ends of the sheaths 25-28 may be adjusted. The fraction of a periodic cycle in which traction is applied by a Bowden cable and/or the amplitude of the traction applied may be adjusted by re-setting the position of the second drive member 9 relative to the first drive member 7, 8.

Figure 8:
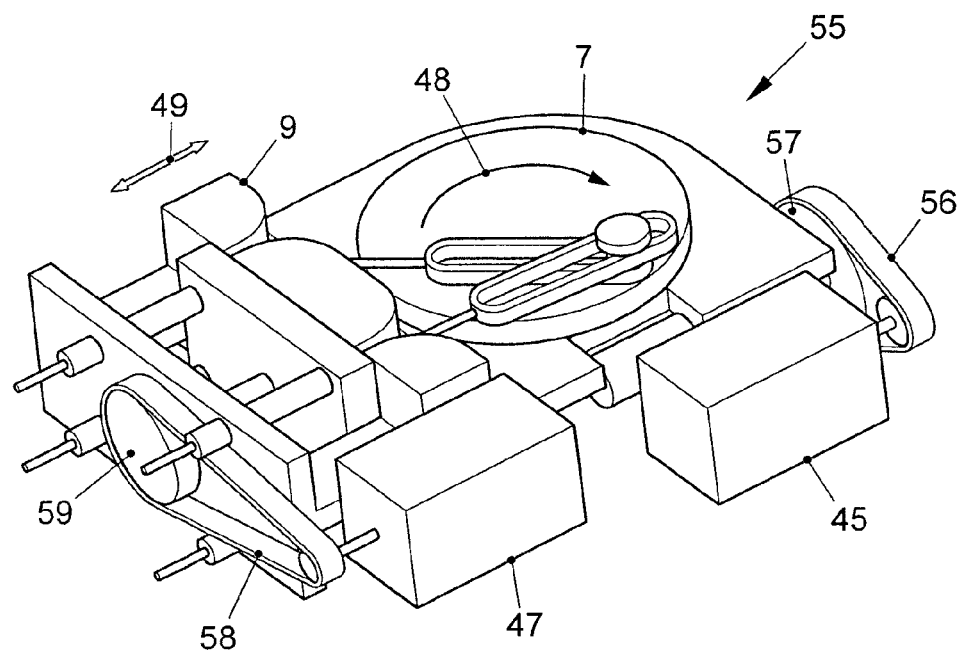
FIG. 8 is a schematic perspective view showing an actuator of an actuator arrangement according to a an embodiment.

FIG. 8 shows an actuator arrangement 55 according to another embodiment. The actuator arrangement 55 is generally similar to the actuator arrangement 50 of FIGS. 5-7 with the exception of the transmission configuration.

In the actuator arrangement 55, the first transmission coupled between the first power drive 45 and the first drive members 7 and 8, respectively, includes a transmission belt 56 coupled to an output shaft of the first power drive 45. The transmission belt 56 drives a pulley 57. A worm is rigidly coupled to the pulley 57 and forms a worm drive with the external toothing of one of the first drive members 7 and 8.

The second transmission coupled between the second power drive 47 and the second drive member 9 includes a transmission belt 58 coupled to an output shaft of the second power drive 47. The transmission belt 58 drives a pulley 59. A spindle is rigidly coupled to the pulley 59 and forms a spindle drive in combination with a mating thread on the second drive member 9, to effect a linear displacement of the second drive member 9.

Figure 9:
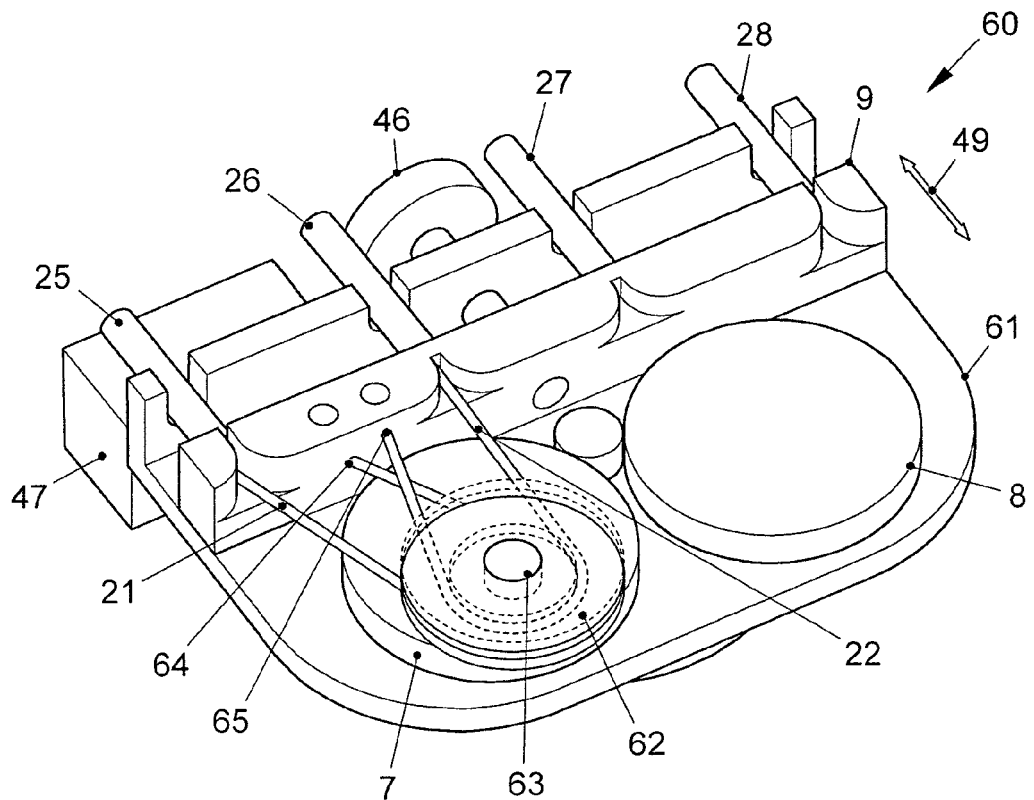
FIG. 9 is a schematic perspective view showing an actuator of an actuator arrangement according to an embodiment.

FIG. 9 shows an actuator arrangement 60 according to another embodiment. The actuator arrangement 60 is generally similar to the actuator arrangement 40 of FIGS. 2 and 3 with the exception of the attachment of the first elements of the traction members. In the actuator arrangement 60, the first elements of the traction members are constituted by inner cables 21 and 22 of Bowden cables. The second elements of the traction members are constituted by sheaths 25 and 26.

In the actuator arrangement 60, an intermediate portion of the first elements of the traction members, i.e. an intermediate portion of the inner cables 21 and 22, is attached to the first drive member 7 via a mount 62. A first end 64 of the inner cable 21 is fixedly secured on the second drive member 9. A first end 65 of the inner cable 22 is fixedly second on the second drive member 9. The inner cables 21 and 22 of the Bowden cables are respectively received and guided in a recess of the mount 62.

The mount 62 may include disc-shaped portions, which are respectively formed with an annular recess for receiving the associated inner cable 21 or 22, respectively. The mount 62 may be rotatable about a pin 63 which protrudes from the first drive member 7 to reduce forces acting onto the inner cables 21 and 22.

In the actuator arrangement 60, the first elements of the traction members, i.e. the inner cables 21 and 22, are coupled to both the first drive member 7 and to the second drive member 9. In such a configuration, a given displacement of the second drive member 9 relative to the first drive member 7 has a stronger effect on the offset length by which the second ends of the inner cables 21 and 22 protrude from the second ends of the associated sheaths 25 and 26, respectively, as compared to a configuration in which the inner cables 21 and 22 are not coupled to the second drive member. In other words, a smaller displacement 49 of the second drive member 9 is required in order to alter the offset length by which the second ends of the inner cables 21 and 22 protrude from the second ends of the associated sheaths 25 and 26, respectively, by a desired amount. This allows the actuator to be provided with a compact design.

Figure 10:
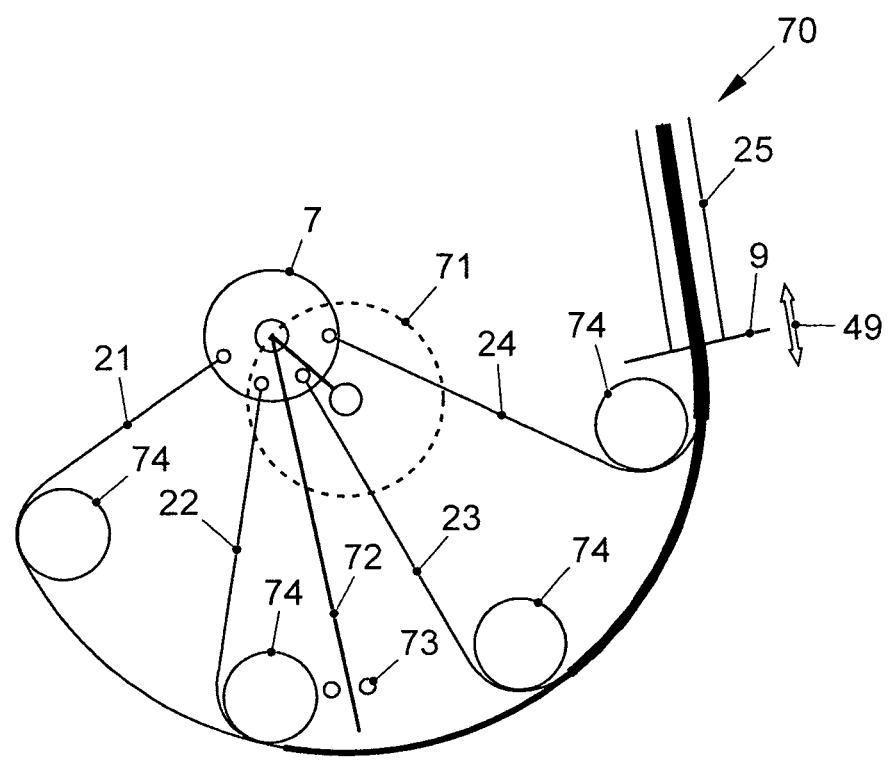
FIG. 10 is a schematic plan view showing an actuator of an actuator arrangement according to an embodiment.

FIG. 10 shows a schematic plan view of an actuator arrangement 70 according to another embodiment. The actuator arrangement 70 includes traction members respectively configured as Bowden cables and an actuator. The traction members respectively have an inner cable 21-24 and a sheath in which the associated inner cable 21-24 is guided. In the actuator arrangement 70, the inner cables 21-24 serve as first elements coupled to rotatable first drive members and the sheaths serve as second elements coupled to a linearly displaceable second drive member.

The actuator arrangement 70 includes a first drive member 7 on which the inner cables 21-24 of the Bowden cables are secured. The inner cables 21-24 are guided by guide elements 74 towards a second drive member 9. End of the sheaths of the Bowden cables are attached to the second drive member 9. The sheaths of the Bowden cables may be attached to the second drive member 9 so as to be offset in a direction perpendicular to the drawing plane of FIG. 10. Therefore, only the topmost sheath 25 is represented in FIG. 10. Similarly, the different inner cables 21-24 may be guided in different planes which are offset from each other in a direction perpendicular to the plane in which the first drive member 7 moves.

The first drive member 7 of the actuator arrangement 70 does not perform a purely rotational movement about its centre, but travels along a closed path 71. The closed path 71 may be essentially circular. The first drive member 7 may perform some tilting movement about its center axis while rotating about the center of the path 71. The movement of the first drive member 7 may be adjusted using suitable guides, such as a guide track for defining the path 71 and/or a guide bar 72 which is articulated to the first drive member 7 and which is slideably retained by a bracket 73.

The actuator arrangement 70 may further include a first power drive and first transmission for effecting movement of the first drive member 7 along the path 71, and a second power drive and second transmission for displacing the second drive member 9. The second drive member 9 may be supported so as to be displaceable along a linear path or may be rotatably mounted. For illustration, the second drive member 9 may also be supported to be rotatable about the center of the path 71.

In operation, movement of the first drive member 7 along the path 71 causes the inner cables 21-24 to be displaced relative to their associated sheaths in a cyclical manner. When the first drive member 7 has travelled along the path 71 once, the inner cables 21-24 are in the same position relative to the associated sheaths as at the beginning of the movement of the first drive member 7. In particular, the inner cables 21-24 are not wound up as the first drive member 7 continues to travel along the path 71.

Movement of the second drive member 8 adjusts an offset for the lengths by which second ends of the inner cables 21-24 protrude from the associated sheaths at second ends thereof. Thereby, an amplitude of the traction applied by the Bowden cables may be adjusted.

In the actuator arrangements explained with reference to FIGS. 2-10, the inner cables of Bowden wires are attached to the first drive member which, in operation, performs a rotating movement. Alternatively, the sheaths of Bowden wires may be attached to the first drive member.

Figure 11:
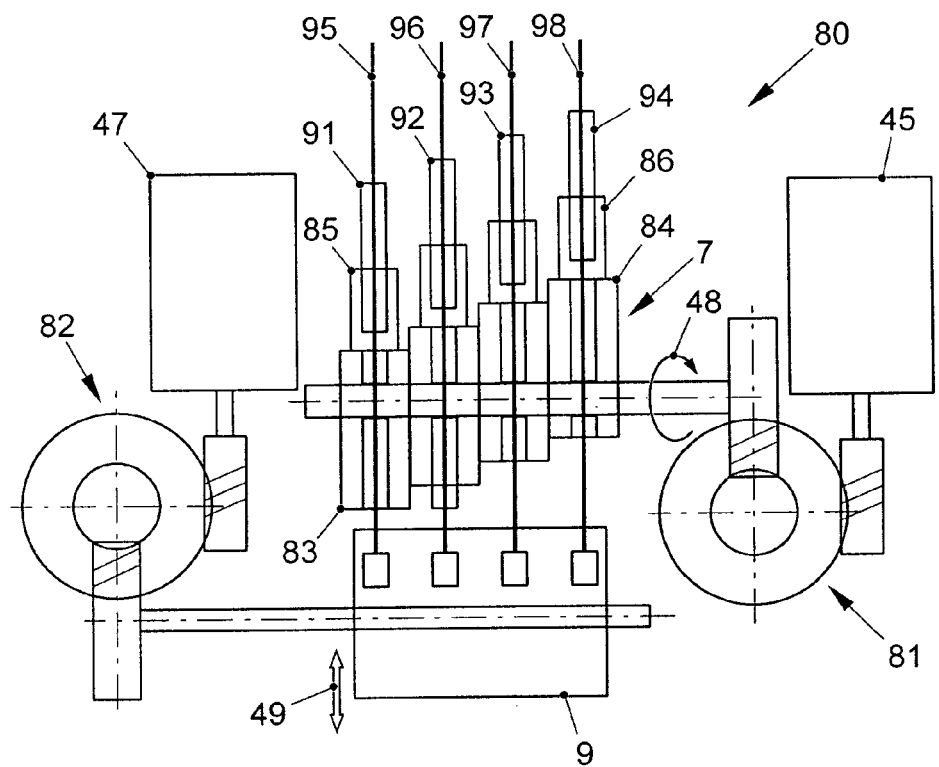
FIG. 11 is a schematic plan view showing an actuator of an actuator arrangement according to an embodiment.

FIG. 11 shows an actuator arrangement 80 according to another embodiment. The actuator arrangement includes traction members respectively configured as Bowden cables and an actuator. The traction members respectively have an inner cable 95-98 and a sheath 91-94 in which the associated inner cable 95-98 is guided. In the actuator arrangement 80, the sheaths 91-94 serve as first elements coupled to a rotatable first drive member and the inner cables 95-98 serve as second elements coupled to a linearly displaceable second drive member.

The actuator includes a housing (not shown). A first drive member 7 is supported on or in the housing. The first drive member 7 is configured as a cam shaft having a shaft and a plurality of cams 83, 84 formed thereon. The sheaths 91-94 are coupled to the cam shaft. The coupling is implemented such that upon rotation 48 of the cam shaft 7, which serves as first drive member, the ends of the sheaths 91-94 are cyclically displaced away from and towards the cam shaft 7. For illustration, the end of the sheaths 91-94 may respectively received in end members 85, 86 which are supported so as to be linearly displaceable. The end member 85, 86 may be biased against the associated cam by the sheaths 91, 94. For illustration, the sheath 91 may be received in the end member 85. The end member 85 may be biased against the cam 83. Similarly, sheath 94 may be received in the end member 86. The end member 86 may be biased against the cam 84.

The second drive member 9 is a block to which the inner cables 95-98 are affixed. The second drive member 9 is supported on or in the actuator housing so as to be linearly displaceable.

The actuator arrangement 80 further includes a first power drive 45 and a first transmission 81 for driving the first drive member 7. The first transmission may be a two-stage transmission comprising two worm drives to effect a speed reduction.

The actuator arrangement 80 also includes a second power drive 46 and a second transmission 82. The second transmission may include a stage for speed reduction, and another stage to convert a rotational movement into a displacement 49 of the second drive member 9.

In operation, when the first power drive 45 is powered, the first drive member 7 rotates. The cams 83, 84 then effect a reciprocating movement of the ends of the sheaths 91-94 which are coupled to the first drive member 7. The lengths by which the inner cables 95-98 protrude from the associated sheaths, at the second end thereof which is not attached to the actuator, is altered in a cyclical manner. Further, the change in length may be alternating from one Bowden cable to another Bowden cable. The traction applied by the Bowden cables is correspondingly altered in a cyclical manner as the first drive member 7 rotates, without requiring the rotation direction to be reversed.

When the second power drive 47 is powered, the second drive member 9 is displaced in a translatory fashion relative to the first drive member 7. The length by which the inner cables 95-98 protrude from the associated sheath, at the second end thereof, is altered by displacing the second drive member 9 relative to the first drive member. The change is the same for the various Bowden cables. For illustration, the length by which the inner cables 95-98 protrude from the associated sheath, at the second end thereof, may be increased for all Bowden cables or may be decreased for all Bowden cables, depending on the direction of movement of the second drive member 9.

Figure 12:
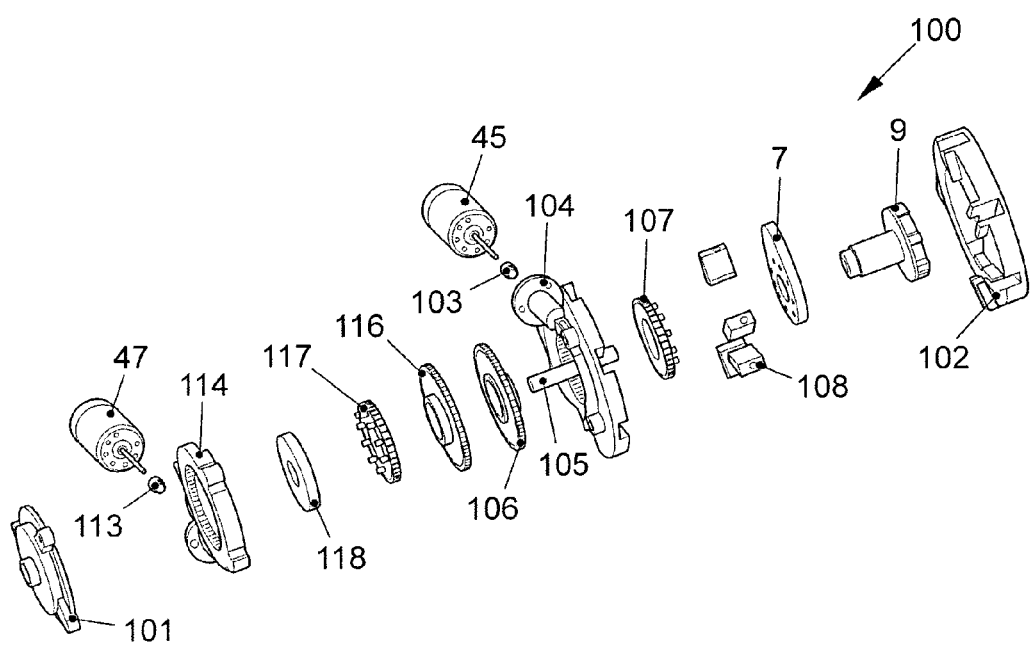
FIG. 12 is an exploded view of an actuator of an actuator arrangement according to an embodiment.
Figure 13:
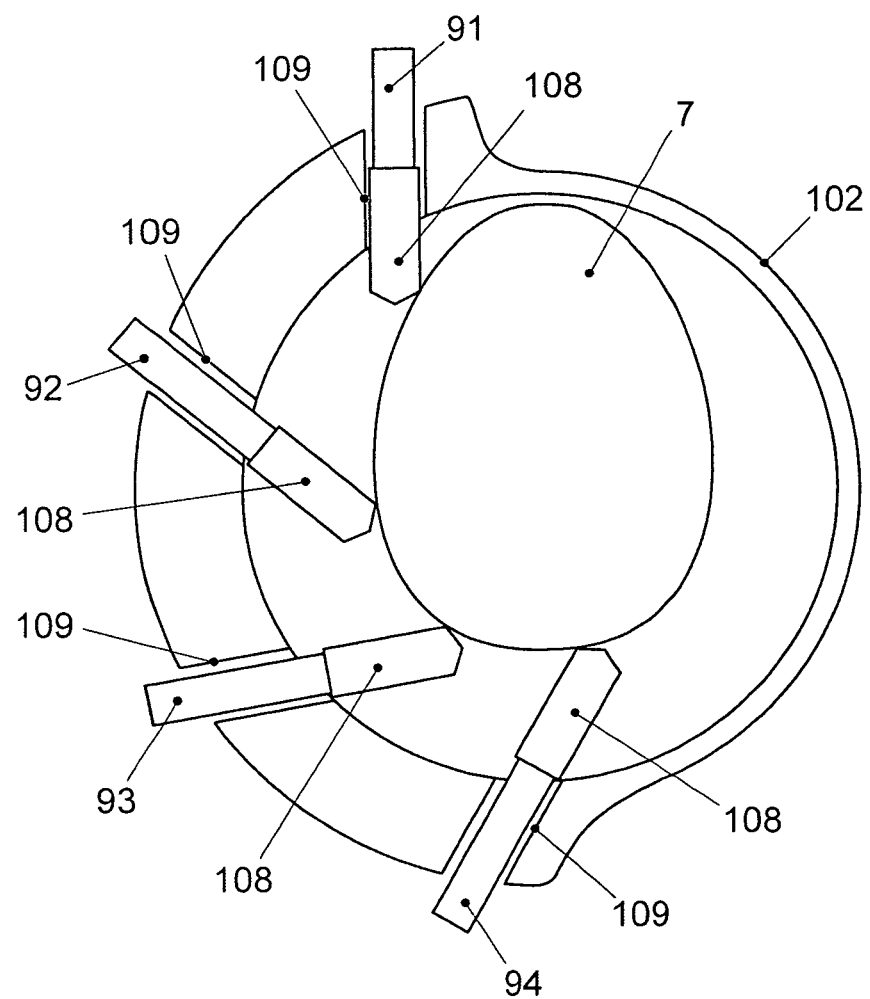
FIG. 13 is a sectional view of the actuator of FIG. 12.

FIGS. 12 and 13 show an actuator 100 for an actuator arrangement according to another embodiment. The actuator is configured such that it can adjust the traction applied by traction members configured as Bowden cables. The Bowden cables respectively have an inner cable and a sheath 91-94 in which the associated inner cable is guided. In the actuator arrangement in which the actuator 100 is to be used, the sheaths 91-94 serve as first elements coupled to a rotatable first drive member and the inner cables serve as second elements coupled to a second drive member which is also rotatably mounted.

The actuator 100 includes a housing having opposing end portions 101 and 102 and intermediate portions 104, 114. The actuator has a first drive member 7 which is cam-shaped and a second drive member 9. Both the first drive member 7 and the second drive member 9 are rotatably supported in the housing. As will be explained in more detail, while rotation of the first drive member 7 gives rise to a reciprocating movement of the sheaths 91-94 coupled thereto as the first drive member 7 completes a 360° rotation, a traction applied by the Bowden cables may continuously increase as the second drive member 9 rotates in one direction. The second drive member 9 may be configured such that it is limited to performing less than a 360° rotation.

The actuator 100 includes a first power drive 45 and a first transmission coupled between the first power drive 45 and the first drive member 7 for driving the first drive member 7. The first transmission generally includes a combination of a worm drive and of a wobble drive. The first transmission includes a worm 103 mounted on the output shaft of the first power drive 45 and a worm gear 106 in toothed engagement with the worm 103. The worm 103 and worm gear 106 constitute a worm drive. The first transmission also includes a wobble gear 107. The wobble gear 107 is coupled to the worm gear 106 so as to rotate therewith. External teeth of the wobble gear 107 are in toothed engagement with internal teeth formed in the housing section 104. Pins formed on the wobble gear 107 are received in recesses in the first drive member 7 so as to allow the first drive member 7 to rotate about a central shaft 105 in accordance with the wobbling movement of the wobble gear 107.

In use, when the first power drive 45 is actuated, the worm gear 106 is driven via the worm 103. The wobble gear 107 rolls off along the internal teeth of the housing section 104. The wobbling movement of the wobble gear 107 is transferred to the first drive member 7. A speed reduction is thereby implemented which reduces the requirements imposed on the output torque of the first power drive 45.

The actuator 100 also includes a second power drive 47 and a second transmission coupled between the second power drive 46 and the second drive member 9 for driving the second drive member 9. The second transmission generally includes a combination of a worm drive and of a wobble drive. The second transmission includes a worm 113 mounted on the output shaft of the second power drive 47 and a worm gear 116 in toothed engagement with the worm 113. The worm 113 and worm gear 116 constitute a worm drive. The second transmission also includes a wobble gear 117. The wobble gear 117 is coupled to the worm gear 116 so as to rotate therewith. External teeth of the wobble gear 117 are in toothed engagement with internal teeth formed in the housing section 114. Pins formed on the wobble gear 117 are received in recesses in a disc member 118 so as to allow the disc member 118 to rotate about a central shaft 105 in association with the wobbling movement of the wobble gear 117. The second drive member 9 is coupled to the disc member 118 so as to rotate together with the disc member 118.

In use, when the second power drive 47 is actuated, the worm gear 116 is driven via the worm 113. The wobble gear 117 rolls off along the internal teeth of the housing section 114. The wobbling movement of the wobble gear 117 is transferred to the second drive member 9. A speed reduction is thereby implemented which reduces the requirements imposed on the second power drive 47.

When the actuator 100 is used in an actuator arrangement, ends of Bowden cable sheaths are received in guide blocks 108. The guide blocks 108 are slidingly supported in the housing portions 102 and 104. The guide blocks 108 are biased toward the cam-shaped first drive member 107 by the Bowden cable sheaths, so that an inner face of the guide blocks may abut on an exterior surface of the cam-shaped first drive member 7.

FIG. 13 illustrates this configuration in a cross-sectional view taken through the actuator 100 in a plane intersecting the guide blocks 108. The guide blocks 108 are respectively received in a guide recess 109 formed in the actuator housing. The Bowden cable sheaths 91-94 bias the guide blocks 108 towards the cam-shaped first drive member 107.

When the first power drive 45 is actuated, the cam-shaped first drive member 7 rotates. Thereby, the guide blocks 108 and the ends of the sheaths 91-94 received therein are forced in a direction outwardly of the actuator housing as the large radius section of the cam-shaped first drive member 7 passed therealong. The movement of the ends of the sheaths 91-94 towards and out of the actuator housing are cyclical as the first drive member 7 continues to rotate after completion of a 360° rotation. The position of the sheaths 91-94 prior and after a full 360° rotation of the first drive member 7 is identical, i.e., the sheaths 91-94 return to their position relative to the housing after the first drive member 91-94 has completed a 360° rotation, for any initial position of the 360° rotation.

The inner cables of the Bowden cables are guided into the sheaths 91-94 in a plane offset from the one shown in the cross-sectional view of FIG. 13. Ends of the inner wires are attached to the second drive member 9. By rotating the second drive member 9 in a direction of rotation, all inner cables may be drawn further into the actuator housing. By rotating the second drive member 9 in the opposite direction of rotation, all inner cables may be played out further from the actuator housing. Thereby, an offset length by which an inner cable protrudes from the associated sheath 91-94, at the second end thereof which is not attached to the actuator 100, may be increased or decreased by selectively rotating the second drive member 9 in one direction or the opposite direction.

The actuator 100 may be used for implementing a massage function and/or for setting an apical position and curvature of a support structure, as described in connection with FIGS. 1-4.

The actuator arrangements according to various embodiments may be coupled to an adjustable component of a seat in various ways. In some implementations, the traction members may be directly coupled to different zones of the adjustable component of the seat. In other embodiments, the traction members may be coupled to different zones of the adjustable component of the seat via intermediate coupling members.

Figure 14:
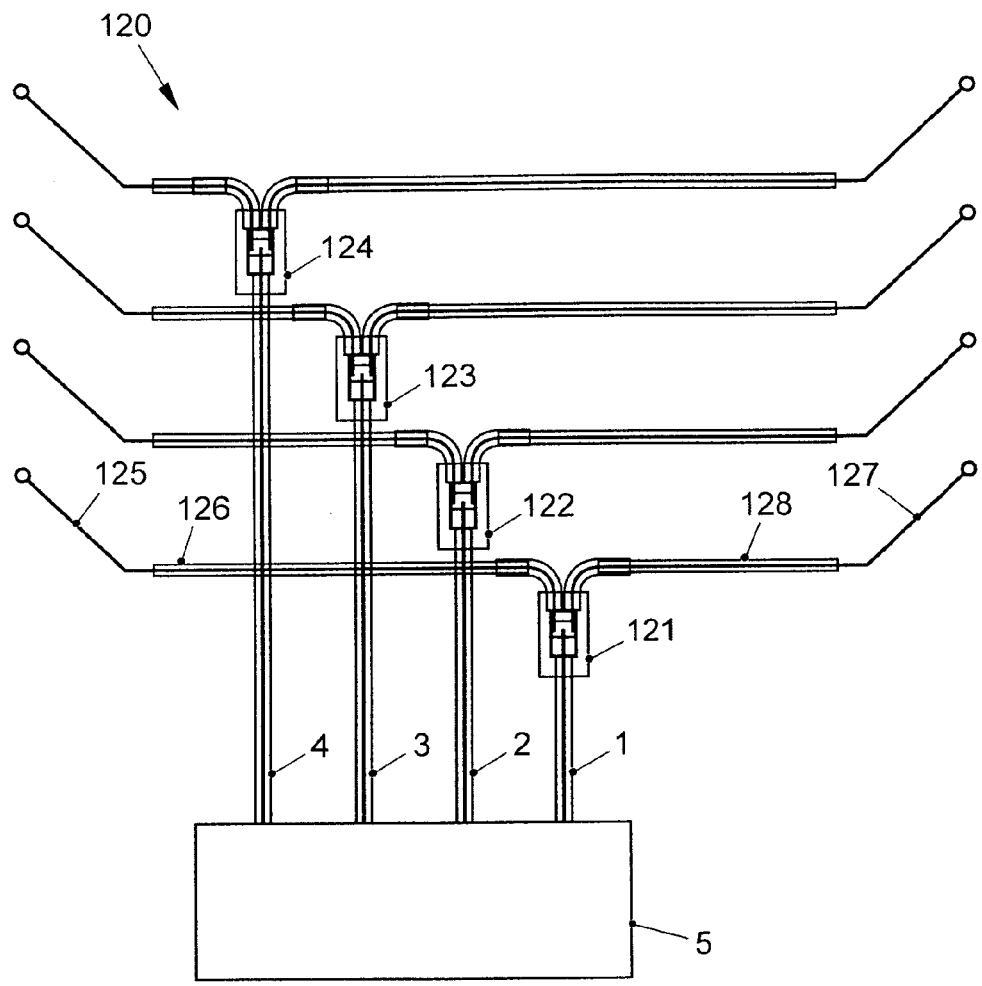
FIG. 14 is a schematic view of an actuator arrangement according to an embodiment.

FIG. 14 is a schematic representation of an adjusting device 120 according to an embodiment. The adjusting device 120 includes plural transverse wires of an adjustable seat component which may be coupled to opposite sides of a seat back frame. The transverse wires are respectively coupled to different zones of the adjustable component. For illustration, as shown in FIG. 1, different transverse wires may be provided to act upon different zones of a lumbar support structure, with the zones being offset along the seat back.

The wire acting on the lowest zone of the support structure has a first wire 126 and a second wire 127 coupled to opposite sides of the seat back frame. The first wire 125 is guided in a first conduit 126 and the second wire 127 is guided in a second conduit 128. The first wire 125, the first conduit 126, the second wire 127 and the second conduit 128 are all coupled to a cable splitter 121.

The wires acting on the other three zones may have an identical configuration, with the wires being coupled to cable splitters 122-124.

The adjusting device 120 further includes traction members 1-4 which may be configured as Bowden cables and an actuator 5. The actuator 5 may be configured as described in connection with any one embodiment.

A first traction member 1 is coupled to the cable splitter 121. The cable splitter 126 is operative to transfer a traction applied by the first traction member 1 into a traction applied onto the wires 125, 127. Thereby, a force can be generated which acts onto the adjustable seat component and displaces a portion thereof via the traction applied by the traction member 1. Similarly, forces acting onto the other zones can be set via the traction members 2-4. As explained with reference to FIGS. 2-13, the actuator 5 allows the traction applied to different zones to be cyclically altered by rotating the at least one first drive member, and further allows an amplitude of the traction applied in the various zones to be adjusted by displacing the second drive member.

By selecting the attachment of the inner cables to the first and/or second drive member, and in particular by selecting offsets between the locations at which the inner cables are respectively coupled to the first and/or second drive member, different movement patterns may be implemented. For example, the traction applied by the traction members 1-4 may be selected such that the zone acted upon by traction member 1 is actuated first, then the zone acted upon by traction member 2, then the zone actuated by traction member 3 and finally the zone actuated upon by traction member 4. The massage cycle may then be repeated in a cyclic manner. Other massage cycles may be implemented, such as first actuating the zone associated with traction member 1, then actuating the zone associated with traction member 3, then actuating the zone associated with traction member 2, and finally actuating the zone associated with traction member 4. The massage cycle may then be repeated in a cyclic manner. The actuator arrangement may be easily adjusted to different massage cycles required in the respective application by adjusting the lengths of the traction members and/or the locations at which they are coupled to the actuator.

Further, by selecting the locations at which the inner cables are attached to the first and/or second drive member, the relative timing at which the different traction members go into a state in which they do not apply traction may be set.

Figure 15:
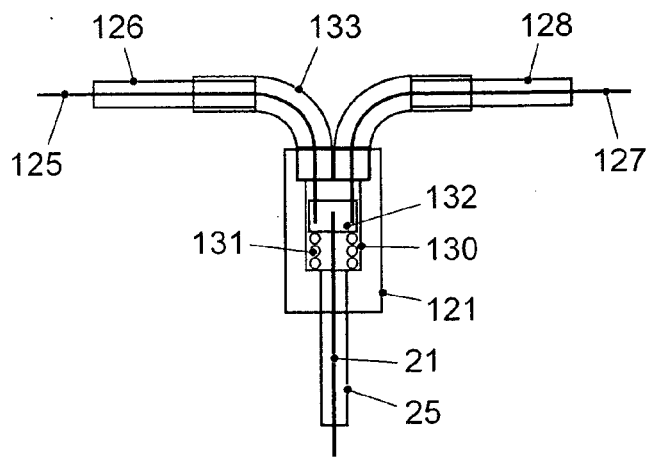
FIG. 15 is a schematic detail view of a cable splitter.

FIG. 15 is a schematic representation of a cable splitter 121. The cable splitter 121 includes a cavity 130 formed therein. A block 132 is slideably supported in the cavity 130. The block 132 may be biased by a bias means 131, for example a spring. In other variants, the bias means 131 may be omitted. An inner cable 21 of a traction member 1 and the wires 125 and 127 of the seat adjusting device are fixedly secured on the block 132. The sheath 25 of the traction member 1 is received in a receptacle formed on the cable splitter 121 and abuts thereon. Additional receptacles are provided for the conduits 126 and 128. The wires 125 and 127 are guided through a guide portion towards the associated conduits 126 and 128, respectively.

In use, when traction is applied to the inner cable 21, the block 132 is displaced against the bias of the bias means 131. The resulting movement of the block 132 applies traction onto the wires 125 and 127, respectively. When the traction applied to the inner cable 21 is released, the block 132 is displaced by the bias of the bias means 131, thereby releasing the traction applied onto the wires 125 and 127.

A cable splitter as schematically illustrated in FIG. 15 may be used for coupling an actuator arrangement to an adjustable seat component. For illustration, the connecting member 17 of the seat structure 10 of FIG. 1 may be operative as described for the cable splitter of FIG. 15.

While embodiments have been described in which an amplitude of a massage movement may be adjusted while a massage cycle is implemented using continued rotation of one or more first drive members, according to other embodiments, the actuator arrangement does not need to be configured such that the amplitude of the traction can be adjusted. To this end, in any one of the actuator arrangements described with reference to FIGS. 1-15, the second drive member and associated transmission and power drive may be omitted.

Further, while traction members have been described which include a conduit and an inner cable, other configurations may be used. For illustration, a traction member may respectively also be formed by a wire or cable only. In this case, the plurality of traction members may be formed by a plurality of wires or cables. It is also possible to combine traction members which have a conduit for an inner wire or inner cable with traction members which do not have a conduit. Traction members which do not have a conduit may be used in actuator arrangements which have a second drive member for adjusting the amplitude. Traction members which do not have a conduit may also be used in actuator arrangements which do not have a second power drive for adjusting the amplitude of traction applied.

Figure 16:
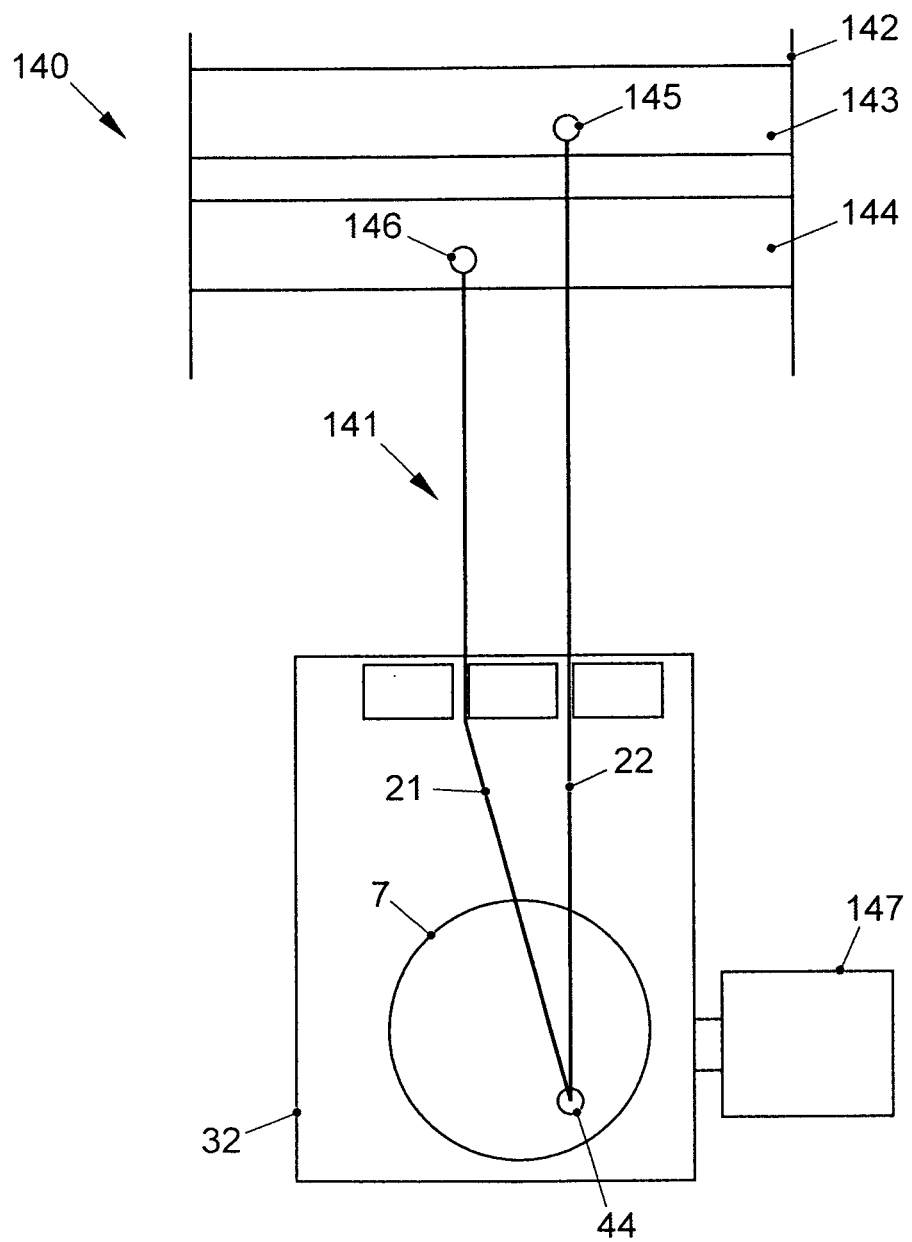
FIG. 16 is a schematic view of a a seat structure having an actuator arrangement according to an embodiment.

FIG. 16 is a schematic representation of a seat assembly 140 which has an actuator arrangement 141 and an adjustable component 142. The adjustable component includes several wires, plastic belts 143, 144 or similar upon which traction members of the actuator arrangement act. The plastic belts 143, 144 may be components of a lumbar support. For illustration, the plastic belts 143, 144 may be components of a basket-type lumbar support or any other lumbar support structure which is adjustable by action of an actuator.

The actuator arrangement 141 includes two traction members 21, 22 which may be formed as wires or cables. The traction members 21, 22 do not need to be guided in conduits. Instead of wires or cables, elongated bars formed from plastic or metal may also be used.

The actuator arrangement 141 includes an actuator. The actuator has a housing 32 in which a first drive member 7 is rotatably supported. The traction members 21, 22 are attached to the first drive member 7 using a mount 44. The mount 44 is configured such that continued rotation of the first drive member 7 in any one of the two rotation directions gives rise to an cyclical change in the traction applied by the traction members 21, 22. The traction members 21, 22 are not wound or unwound as the first drive member 7 rotates through plural full rotations.

The traction member 21 is attached to the plastic belt 144 via an attachment 146. The traction member 22 is attached to the plastic belt 143 via an attachment 145. The attachments 145, 146 may be configured such that, for example, a free length between the ends of the plastic belts 143 or 144 is changed in response to the traction applied by the traction member 21 or 22. Thereby, the different zones of the adjustable component can be actuated.

In the actuator arrangement 141, continued rotation of the first drive member 7 gives rise to a cyclical change in the traction applied. This in turn effects a oscillating actuation of the plastic belts 143 and 144. Upon completion of a 360 degree rotation of the first drive member 7, each one of the traction member 21, 22 applies the same traction as at the beginning of the 360 degree rotation. I.e., a cyclical change in the traction is realized by rotation of the first drive member 7, with one cycle being completed by a 360 degree rotation of the first drive member 7. The first drive member 7 is driven by a first power drive coupled to the first drive member 7 via a transmission.

If it is not desired to provide amplitude adjustment, the rotation axis of the first drive member 7 may be mounted stationary relative to the plastic belts 143, 144 which are adjusted. For illustration, the housing 32 may be mounted on one of the plastic belts 143, 144. The housing 32 may then move jointly with the plastic belt 143, 144 to which it is attached. The plastic belts 143, 144 may be linked with each other via hinge-like structures. Alternatively, the housing 32 with the first drive member 7 may be mounted stationary relative to a seat frame to which the lumbar support is attached.

For amplitude adjustment, a second power drive 147 may optionally be provided. The second power drive 147 may be configured such that it displaces the rotation axis of the first drive member 7 relative to the seat. For illustration, the rotation axis of the first drive member 7 may be displaced relative to the housing 32 or together with the housing 32 when the second power drive 147 is actuated. Thereby, an offset in the traction applied by the traction member 21 and 22 may be adjusted.

If it is intended to provide amplitude adjustment functionality, the second power drive 147 may be coupled to the housing 32 or to first the drive member 7 via a transmission which ensures that the rotation axis of the first drive member 7 remains stationary unless the second power drive 147 is actuated.

While embodiments have been described with reference to the drawings, various modifications may be implemented in further embodiments. For illustration, an actuator arrangement may include two, three, four, five, six or more than six traction members. The adjustable component may include an associated number of zones coupled to the traction members.

For further illustration, in any one of the embodiments described herein, a mechanical energy storage member may be coupled to the at least one first rotatable drive member. The mechanical energy storage member may be coupled to the first drive member in such a way that, when the first drive member is in a rotational position in which the traction applied onto one of the zones via one of the traction members is increased, the mechanical energy storage member exerts a torque onto the first drive member which is directed in the same direction as the torque applied onto the first drive member by the first power drive. The mechanical energy storage member may be coupled to the first drive member in such a way that, when the first drive member is in a rotational position in which the traction applied onto the one of the zones is decreased, the mechanical energy storage member exerts a torque onto the first drive member which is directed in the opposite direction as the torque applied onto the first drive member by the first power drive. By virtue of such a configuration, the mechanical energy storage member may take up energy from the actuator when this energy is not required for increasing the traction applied to the one of the traction members. The mechanical energy storage member releases energy and assists the first power drive in rotating the first drive member when this energy is required for increasing the traction applied to the one of the traction members.

If a mechanical energy storage device is provided, the mechanical energy storage device may exert a torque onto the first drive member which acts onto the first drive member in the same direction as the torque applied by the first power drive when the first drive member, due to its rotation, makes a transition from a state in which no traction is applied to any one of the traction member to another state in which traction is applied to one of the traction members. Thereby, the requirements imposed onto the first power drive may be reduced and over-dimensioning of the first power drive may be avoided.

Various configurations for such a mechanical energy storage member may be used. For illustration, the mechanical energy storage member may include a spring or other resilient member coupled to the at least one first drive member. The spring may be received in a recess defined by the actuator housing. One end of the spring may abut on the housing, and the other end of the spring may abut on a slide member received in the recess. The slide member may be coupled to the first drive member using a wire, cable or another connector. The coupling may be such that the resilient member is compressed, via the flexible connector and slide member, thereby storing energy, when the first drive member is in one range of angular positions, and that the resilient member is allowed to decompress when the first drive member is in another range of angular positions, thereby releasing energy towards the first drive member.

Referring to FIG. 4 for further illustration, the spring or other resilient member may be coupled to the first drive member 7 via a connector. The connector may be attached to the first drive member 7 such that the spring or other resilient member, via the connector, helps the first power drive to rotate the first drive member 7 when the mount 44 enters the angular range 30.

For further illustration, while embodiments have been described in which one or plural traction members are coupled to a rotatable first drive member using one mount, the number and positions of mounts provided on a first drive member for attachment of traction members and/or the number of first drive members may be selected as desired.

For further illustration, while embodiments have been described in which a traction member is coupled to a portion of an adjustable component of a seat using a cable splitter, other configuration may be used to convert the traction applied by a traction member into a displacement of the associated portion of the adjustable component. For illustration rather than limitation, a coupling as described in EP 1 680 984 A1 may be used. Alternatively or additionally, the traction member may be coupled to the associated zone of the adjustable component in a manner such that a free length between attachment points at which the adjustable component is attached to a seat frame is set in response to the traction applied by the respective traction member.

For further illustration, while embodiments have been described in which the actuator arrangement includes a first power drive for driving the first drive member and a second power drive for driving the second drive member, the actuator may also have another number of power drives or no power drive at all. For illustration, the actuator arrangement may have a manual drive for adjusting the position of the second drive member, and a power drive for driving the first drive member. Further, while embodiments have been described in which the second drive member is a one-piece member, the second drive member may also have several separate portions.

While embodiments have been described in which the second drive member is displaceable relative to an actuator housing, other configurations may be chosen to implement a second drive member which is displaceable relative to the at least one first drive member. For illustration, the second drive member may be stationary relative to the actuator housing, while the at least one first drive member may be rotatable about one or plural rotation axes, with the rotation axes being displaceable relative to the housing. A relative displacement between the second drive member and the at least one first drive member can then be realized by displacing the rotation axis of the at least one first drive member relative to the actuator housing.

While some embodiments have been described in the context of adjusting a lumbar support, the actuator arrangements and methods according to embodiments may also be used for adjusting other support structures for seats or other adjustable seat components.

Exemplary embodiments of the invention may be utilized in a wide variety of seats, in particular in vehicle seats for motor vehicle seating, without being limited thereto.

What is claimed is:

1. An actuator arrangement for a seat having:
   the actuator arrangement configured for the seat with at least one of a seat bottom and a backrest;
   an adjustable component, the actuator arrangement comprising:
   a plurality of traction members, each traction member configured to apply traction onto the adjustable component;
   an actuator coupled to the plurality of traction members to concurrently change the traction applied by at least two traction members of the plurality of traction members, the actuator comprising at least one first drive member which is rotatably supported, the at least two traction members being coupled to the at least one first drive member such that a rotation of the at least one first drive member in a direction of rotation changes the traction applied by each one of the at least two traction members onto the adjustable component in a cyclical manner; and
   mounts which couple the at least two traction members of the plurality of traction members to the at least one first drive member, each one of the mounts being rotatable relative to the at least one first drive member about an associated mount rotation axis which is parallel to and spaced from a rotation axis of the at least one first drive member.

2. The actuator arrangement of claim 1,
   wherein the at least two traction members of the plurality of traction members each comprise a first element and a second element which are displaceable relative to each other,
   wherein the first elements are coupled to the at least one first drive member, the actuator further comprising a second drive member which is supported moveably relative to the at least one first drive member, the second elements of the at least two traction members being coupled to the second drive member.

3. The actuator arrangement of claim 2,
   wherein, for the at least two traction members, one of the first element or the second element respectively forms a conduit for the other one of the first element or the second element.

4. The actuator arrangement of claim 2,
wherein the first elements of the at least two traction members are coupled to the at least one first drive member such that a 360° degree rotation of the at least one first drive member effects a reciprocating movement of the first elements coupled thereto relative to the respectively associated second element.

5. The actuator arrangement of claim 4,
wherein the actuator is configured such that an amplitude of the reciprocating movement is adjustable by repositioning the second drive member relative to the at least one first drive member in a translatory manner.

6. The actuator arrangement of claim 2,
each one of the mounts respectively comprising an annular member which is rotatably supported on a pin projecting from the at least one first drive member, the pin extending parallel to the rotation axis of the at least one first drive member.

7. The actuator arrangement of claim 2, wherein the second drive member is rotatably supported.

8. The actuator arrangement of claim 2, wherein the second drive member is supported so as to be linearly displaceable.

9. The actuator arrangement of claim 2,
wherein the actuator is configured such that a traction member of the plurality of traction members applies traction onto the adjustable component when the at least one first drive member has an angular position located within a range of angular positions, the range being adjustable by movement of the second drive member.

10. The actuator arrangement of claim 2, wherein the actuator comprises a housing in which the at least one first drive member is housed, the second drive member being moveably supported in or on the housing.

11. The actuator arrangement of claim 2, wherein portions of the first elements of at least third and fourth traction members of the plurality of traction members are secured on the second drive member such that, upon displacement of the second drive member, the portions of the first elements of the third and fourth traction members are displaced together with the second drive member.

12. The actuator arrangement of claim 1, further comprising
at least one mechanical energy storage member coupled to the at least one first drive member such that the at least one mechanical energy storage member receives and stores energy from the at least one first drive member when the at least one first drive member is in one rotational position, and wherein the at least one mechanical energy storage member supplies energy to the at least one first drive member when the at least one first drive member is in another rotational position.

13. The actuator arrangement of claim 1, wherein the plurality of traction members includes more than two traction members.

14. The actuator arrangement of claim 1, wherein the plurality of traction members includes at least four traction members.

15. The seat structure of claim 1, wherein the adjustable component is a lumbar support.

16. A method of adjusting an adjustable component of a seat, the seat having at least one of a seat bottom and a backrest, and the adjustable component having a plurality of zones, each zone coupled to a separate traction member for selectively applying traction thereto, the traction members being coupled to at least one first drive member, the method comprising:
in response to a control signal, rotating the at least one first drive member to thereby concurrently change the traction applied by at least two of the traction members by the at least one first drive member such that each traction member of the at least two of the traction members is rotatably supported on the at least one first drive member by a mount and cyclically applies traction of increasing and decreasing tension onto a zone of the plurality of zones while the first drive member rotates in a single direction of rotation so as to perform plural full rotations; and
wherein during cyclically applying traction, each one of the mounts rotates relative to the at least one first drive member about an associated mount rotation axis which is parallel to and spaced from a rotation axis of the at least one first drive member.

17. The method of claim 16,
wherein the at least two of the traction members each comprise a first element and a second element, the first elements being coupled to the at least one first drive member, and the second elements being coupled to a second drive member, the method further comprising:
in response to another control signal, displacing the second drive member to adjust an amplitude of the traction respectively applied by the at least two of the traction members.

* * * * *